United States Patent
Hille

(10) Patent No.: US 11,374,516 B2
(45) Date of Patent: Jun. 28, 2022

(54) ELECTROMOTIVE FURNITURE DRIVE, FURNITURE, AND METHOD FOR DETECTING A POSITION OF AN ELECTROMOTIVE FURNITURE DRIVE

(71) Applicant: DewertOkin GmbH, Kirchlengern (DE)

(72) Inventor: Armin Hille, Bielefeld (DE)

(73) Assignee: DewertOkin Technology Group Co. Ltd, Jiaxing (CN)

( * ) Notice: Subject to any disclaimer, the term of this patent is extended or adjusted under 35 U.S.C. 154(b) by 0 days.

(21) Appl. No.: 16/956,305

(22) PCT Filed: Dec. 21, 2018

(86) PCT No.: PCT/EP2018/086704
§ 371 (c)(1),
(2) Date: Jun. 19, 2020

(87) PCT Pub. No.: WO2019/122382
PCT Pub. Date: Jun. 27, 2019

(65) Prior Publication Data
US 2020/0328703 A1    Oct. 15, 2020

(30) Foreign Application Priority Data
Dec. 22, 2017 (DE) ................ 10 2017 131 226.9

(51) Int. Cl.
*H02P 7/00* (2016.01)
*H02P 7/03* (2016.01)
(Continued)

(52) U.S. Cl.
CPC .......... *H02P 7/0094* (2013.01); *A47C 31/008* (2013.01); *H02P 7/04* (2016.02); *A61G 7/018* (2013.01); *A61G 2203/12* (2013.01)

(58) Field of Classification Search
CPC ................. H02P 7/0094; H02P 7/04
(Continued)

(56) References Cited

U.S. PATENT DOCUMENTS

| | | | |
|---|---|---|---|
| 7,397,212 B2 * | 7/2008 | Turner | H02P 23/14 318/561 |
| 7,521,884 B2 * | 4/2009 | Filippenko | H02J 9/066 318/400.06 |

(Continued)

FOREIGN PATENT DOCUMENTS

| | | |
|---|---|---|
| CN | 104271005 | 1/2015 |
| DE | 102009036274 | 4/2010 |

(Continued)

OTHER PUBLICATIONS

International Search Report issued by the European Patent Office in International Application PCT/EP2018/086704 dated Jan. 18, 2019.

*Primary Examiner* — David Luo
(74) *Attorney, Agent, or Firm* — Henry M. Feiereisen LLC

(57) ABSTRACT

An electromotive furniture drive includes an adjustment drive for the electromotive movement of a movable furniture component relative to a further furniture component, a control device, and an operating unit. A motor of the adjustment drive is actuated as a function of signals from the operating unit. The control device includes a semiconductor power switch for switching a motor current of the motor, with a voltage dropping across the semiconductor power switch being supplied to an evaluation unit in order to detect commutation edges of the motor.

21 Claims, 4 Drawing Sheets

(51) Int. Cl.
*A47C 31/00* (2006.01)
*A61G 7/018* (2006.01)

(58) Field of Classification Search
USPC .................. 318/400.29, 400.26, 400.01, 700
See application file for complete search history.

(56) References Cited

U.S. PATENT DOCUMENTS

| | | | |
|---|---|---|---|
| 7,692,396 B2 * | 4/2010 | Ctvrtnicek | A47B 97/00 |
| | | | 318/490 |
| 9,385,640 B2 * | 7/2016 | Sun | H02P 3/12 |
| 9,713,387 B2 | 7/2017 | Hille | |

FOREIGN PATENT DOCUMENTS

| | | |
|---|---|---|
| EP | 1903668 | 3/2008 |
| WO | WO 2013/128035 | 9/2013 |

* cited by examiner

ELECTROMOTIVE FURNITURE DRIVE, FURNITURE, AND METHOD FOR DETECTING A POSITION OF AN ELECTROMOTIVE FURNITURE DRIVE

CROSS-REFERENCES TO RELATED APPLICATIONS

This application is the U.S. National Stage of International Application No. PCT/EP2018/086704, filed Dec. 21, 2018, which designated the United States and has been published as International Publication No. WO 2019/122382 A1 and which claims the priority of German Patent Application, Serial No. 10 2017 131 226.9, filed Dec. 22, 2017, pursuant to 35 U.S.C. 119(a)-(d).

BACKGROUND OF THE INVENTION

The invention relates to an electromotive furniture drive comprising at least one adjustment drive for electromotive movement of at least one movable furniture component relative to another furniture component and a control device for controlling a motor of the adjustment drive via semiconductor power switches. The invention further relates to a method for detecting a position of an adjustment drive of an electromotive furniture drive and a furniture with an electromotive furniture drive.

With an electromotive adjustment drive, a motor of the corresponding adjustment drive is operated to adjust a furniture component, either in a left-hand or a right-hand rotation. Frequently, relays in a pole reversing configuration are used in a control device or motor control of the furniture drive to switch the motor in one or the other direction of rotation based on signals from wired and/or wireless operating units (also called manual controls). This is possible by using relays in a simple electrical configuration. In addition, relays switch loss-free compared to bipolar transistors, for example.

With currently available low-cost, high-performance and also almost loss-free switching semiconductor power switches, such as MOSFETs (Metal-Oxide Semiconductor Field Effect Transistors) or IG-BTs (Insulated Gate Bipolar Transistors), semiconductor-based pole reversing circuits are increasingly used. As a rule, so-called H-bridges are used, which have two bridge branches each with two semiconductor power switches connected in series. The motor of the adjustment drive is connected between the center taps of the bridge branches.

As a rule, all furniture drives support a manual operating mode. In this manual operating mode, two operating elements, e.g. buttons, are provided on the control unit for each adjustment drive, wherein actuation of an operating element allows the motor of the adjustment drive to rotate in one direction or the other.

In addition, there are often operating modes that allow the adjustment drive to comfortably approach certain preset or programmable positions of the adjustment drive with a single keystroke or other command. In addition to an increase in comfort, this can also be a medical requirement for furniture drives, for example to move hospital beds equipped with furniture drives into predetermined protective positions such as a shock position.

In order to be able to move to freely definable positions, position detection of the adjustment drive is required. A relative position detection is often used, in which a relative movement of the adjustment drive is tracked starting from a defined reference position. The defined reference position can be detected, for example, by means of a permanently mounted (limit) switch that is actuated when the adjustment drive reaches a certain position.

A relative movement of the adjustment drive can be detected, for example, by means of rotary sensors arranged on the motor. However, the evaluation of the rotary sensors is complex and sensors and evaluation circuitry make the construction of an adjustment drive more expensive.

For motors switched via relays in a pole reversing configuration, it is also known to detect the motor current, for example via a Hall sensor or via a measuring resistor (shunt). DC motors with a collector, so-called collector motors, show characteristic edges in the measured current curve when their armature magnetic field is commutated by the collector. An evaluation circuit records the edges and outputs a so-called commutation pulse on each edge. The commutation pulses can be counted to determine the relative position of the adjustment drive. Depending on the direction of rotation of the motor, the commutation pulses are added or subtracted to determine an absolute position.

By detecting commutation pulses, additional rotary sensors can be dispensed with. However, loss-free detection of the motor current is only possible with the aid of a Hall sensor, which in turn would increase the price of the adjustment drive. If a shunt is used to measure the current, on the other hand, the energy efficiency of the motor control system drops due to the power loss converted into heat in the shunt. The heat emitted must also be taken into account when dimensioning the motor control unit and must be dissipated. This complicates the design of the motor control.

The invention is based on the object of providing a control device, an electromotive furniture drive as well as a piece of furniture which is as low-maintenance as possible and offers the possibility of determining a position of at least one of the adjustment drives in a cost-effective and energy-efficient manner. It is a further object to create an operating method for an electromotive furniture drive that enables the position to be determined.

SUMMARY OF THE INVENTION

This object is solved by an electromotive furniture drive, a piece of furniture and a method with the features of each independent claim. Advantageous embodiments are the subject matter of the dependent claims.

An electromotive furniture drive of the aforementioned type according to the invention is characterized in that the control device has at least one semiconductor power switch for switching a motor current of the motor, wherein an evaluation unit is supplied with a voltage dropping across the semiconductor power switch in order to detect commutation edges of the motor.

Thus, the existing internal resistance of the applied semiconductor power switch, in particular of a mosfet, is used according to the invention to generate a voltage drop as a measure of the motor current, which is evaluated to detect the commutation of the motor. Since the internal resistance is inherently present in the conductive state of the semiconductor power switch, an additional shunt can be dispensed with, wherein no additional voltage drop is generated. This results in the most energy-efficient operation of the actuator. Furthermore, no additional power loss in the form of heat is generated which would have to be dissipated. The use of mosfets is also advantageous as they provide excellent damping of voltage peaks caused by motor commutation, which means that electronic components of the circuit are well protected.

In an advantageous embodiment of the electromotive furniture drive, four semiconductor power switches in an H-bridge arrangement are provided for each motor used in the adjustment drives. In this way, a pole reversing circuit is realized in order to be able to move the adjustment drive in both directions.

In a further advantageous embodiment, the evaluation unit is connected to at least one center tap of a bridge branch of the H-bridge arrangement. In this way, the voltage signal dropping across one of the circuit breakers can be detected, preferably the voltage signal across the power switch which is connected to a reference potential (ground potential). Often this switch is also referred to as the "low-side" switch of a bridge branch, the other of the switches is called "high-side" switch for distinction. In this way, commutation edges are detected when the motor moves in one direction. An edge detector is preferably used in the evaluation unit. In a simple and advantageous embodiment, this can be an operational amplifier whose inputs are connected to the center tap of a bridge branch via low-pass filters.

In order to detect motor movement in both directions, an edge detector can be coupled in each case to the respective center tap of the two bridge branches.

Alternatively, it is possible to detect both operating directions with only one edge detector by arranging a resistance bridge comprising two resistors in series connection in parallel to the motor. The evaluation unit with the edge detector is connected to a center tap between the resistors. In this way the voltage drop across each switch of the H-bridge is fed to the evaluation unit. The commutation of the motor can be detected by an evaluation unit in both operating directions of the motor. Preferably, the "low-side" and the "high-side" mosfets differ with regard to their contact resistance in order to obtain the best possible signal at the edge detector. If different types of mosfets are used on the positive or negative supply voltage side, e.g. p-types as opposed to n-types, this is usually self-evident.

In an advantageous embodiment with a simple structure, the edge detector can have an operational amplifier whose inputs are connected to the center tap between the resistors via low-pass filters.

A piece of furniture according to the invention has such an electromotive furniture drive.

A method according to the invention is suitable for detecting a position of an adjustment drive of an electromotive furniture drive with at least one adjustment drive for electromotive movement of at least one movable furniture component relative to another furniture component. In this case, the electromotive furniture drive has a control device and an operating unit, wherein a motor of the at least one adjustment drive is controlled as a function of signals from the operating unit, and wherein a motor current of the motor is switched by means of at least one semiconductor power switch. A voltage dropping across the semiconductor power switch is evaluated in order to detect a commutation of the motor.

The furniture and the method have the advantages mentioned above in connection with the electromotive furniture drive.

In a preferred embodiment of the method, an evaluation unit detects edges of the motor current and, if an edge is detected, outputs a pulse at an output. Preferably, the pulses at the output are counted to determine a change in a position of the at least one adjustment drive. In this way, the detection of the commutation serves to determine the position of the adjustment drive relatively. Starting from a reference position, an absolute position of the adjustment drive can be determined using the determined relative position determination.

BRIEF DESCRIPTION OF THE DRAWING

The invention is explained below by means of embodiment examples by reference to the figures, wherein.

DETAILED DESCRIPTION OF PREFERRED EMBODIMENTS

Figure 1:
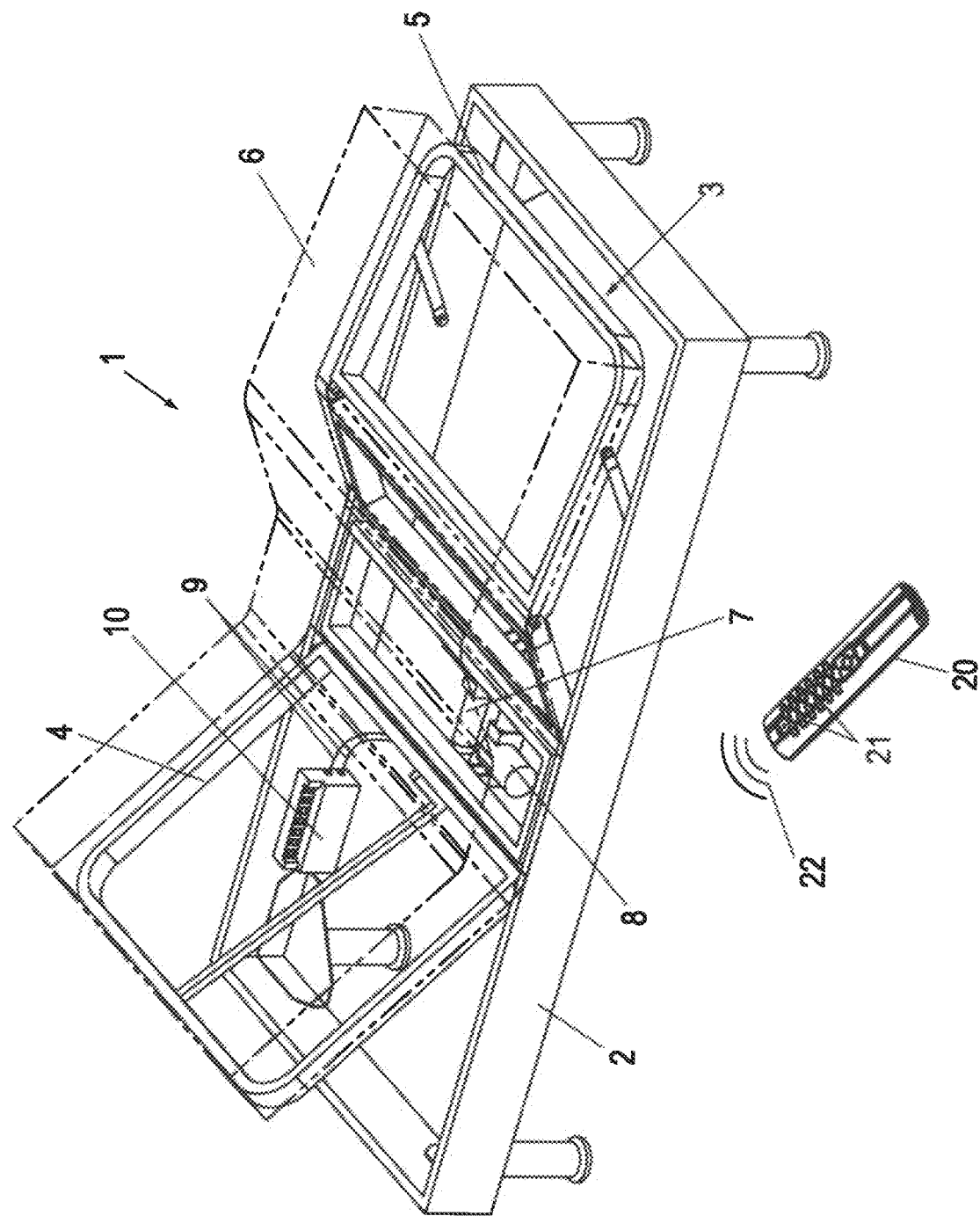
FIG. 1 shows a schematic perspective view of an exemplary furniture arrangement.

FIG. 1 shows a furniture arrangement with a piece of furniture 1. A bed is shown here as an example of furniture 1. Furniture 1 has at least one support element 3 to hold an upholstery, e.g. a mattress 6. The support element 3 is designed as a slatted frame, a flat support surface or the like and is attached to a base element 2. In the example shown, the base element is a frame-like frame with feet, with which the furniture 1 is set up at an installation location, e.g. floor.

In the example shown, support element 3 has a back part 4 and a leg part 5, which are arranged in a movable manner relative to another support element or relative to the base element 2. This movable arrangement is realized here by means of a so-called movement fitting. The movement is designed to be displaceable and/or pivotable.

The movably mounted back part 4 and the leg part 5 are each coupled with an electromotive adjustment drive 7, 8. Thus the back part 4 is coupled to the electromotive adjustment drive 7. The electromotive adjustment drive 8 is provided for moving or adjusting the leg part 5.

The electromotive adjustment drives 7, 8 are designed as linear drives. The linear drives have one or a number of electric motors, wherein each motor is followed by a speed reduction gear with at least one gear stage. The speed reduction gear can be followed by another gear, for example in the form of a threaded spindle gear, which generates a linear movement of an output element from the rotary movement of the motor. The last gear element or a further element connected to it forms the output element. The output element of the respective electromotive adjustment drive is connected to the respective furniture component (back part 4, leg part 5) or alternatively to a component connected to the base element 2, so that when the electric motor of the respective adjustment drive 7, 8 is operated, the movable furniture components 4, 5 are adjusted relative to one another or relative to the base element 2.

The electromotive adjustment drives 7, 8 are connected via cable 9 to a control device 10, also called motor control. This connection can be designed e.g. as a pluggable cable connection, which is not shown in detail here. The control device 10 has an electrical supply unit which provides the electrical energy, e.g. from the mains, for the electromotive adjustment drives 7, 8. For this purpose, the control device 10 can be connected to a mains connection via a mains cable with a mains plug, which is not shown in this example. The mains plug conducts the mains voltage on the input side via the mains cable to the electrical supply unit of the control device 10, which on the secondary side emits a low voltage in the form of a direct voltage and passes this on to a control device 10.

As an alternative to this, a mains-dependent power supply with mains input and with an extra-low voltage output on the secondary side, which is not described in detail, is connected upstream of control device 10 and supplies the extra-low voltage in the form of a DC voltage via the line.

An operating unit 20, also called manual operation, is provided for operating the furniture drive. It has operating elements 21, by means of which the electromechanical adjustment drives 7, 8 can be controlled via the control device 10.

The operating elements 21 can be designed as pushbuttons and/or switches, for example. Furthermore, the operating unit 20 can be equipped with a signaling element, e.g. a light emitting diode or a display unit. The signaling element is used, for example, for function display or feedback, error display, etc.

In the example shown, the operating unit 20 is designed as a remote control unit that sends wireless signals 22. It has at least one transmitter for this purpose, but optionally also a receiver for the wireless signals 21.

A specially designed (hand-held) device can be used as operating unit 20. However, it is also possible to use a universal mobile device, such as a smartphone or a tablet computer, with the corresponding software ("app") as an operating unit 20.

Figure 2:
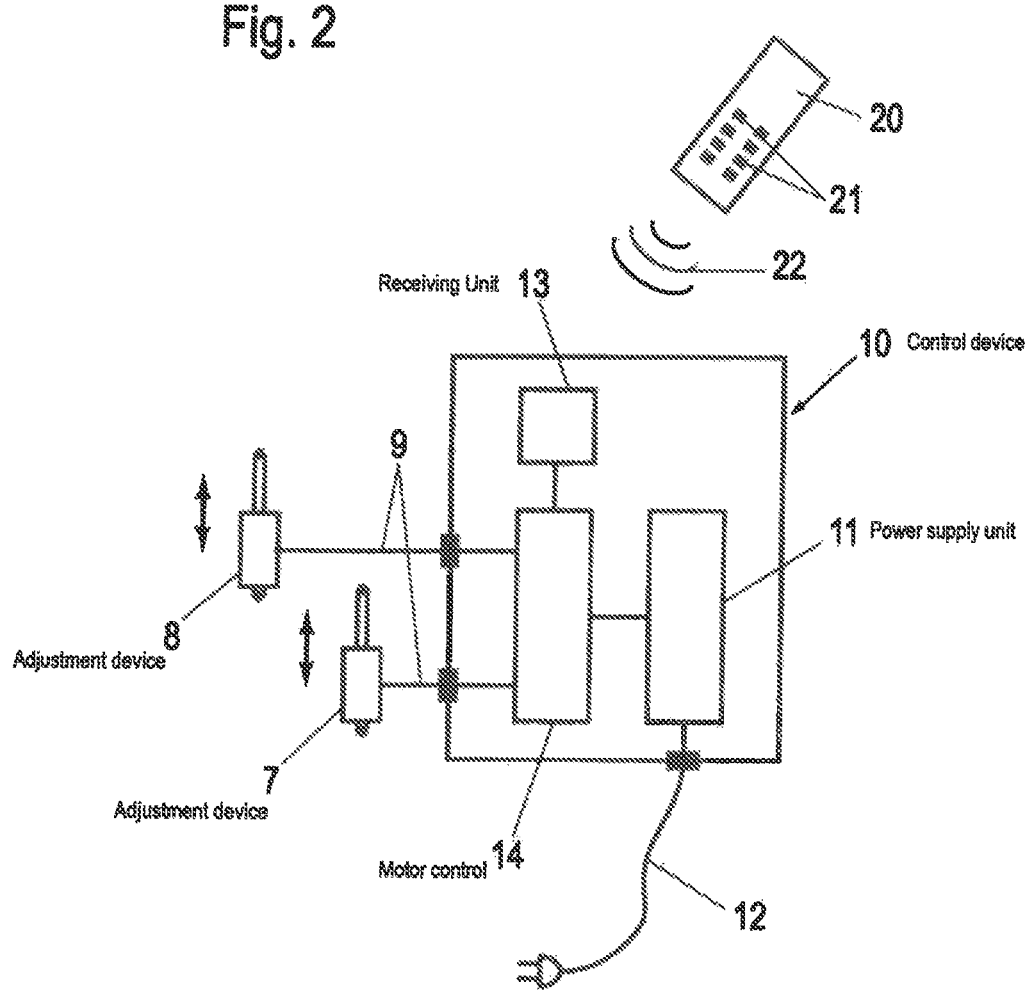
FIG. 2 shows a schematic diagram of an electromotive furniture drive with adjustment drives and a wireless remote control.

FIG. 2 shows the construction of the furniture drive of the embodiment example of FIG. 1 and in particular the control device 10 in more detail in the form of a schematic block diagram.

The control device 10 includes a power supply unit 11, which is supplied with mains power via a mains cable 12. In alternative embodiments, the power supply unit 11 may be located externally of the control device 10 and connected to it via a low voltage line. The control device 10 further comprises one of the receiving units 13, which is set up to receive the wireless signals 22 of the operating unit 20 in this embodiment example. An actuation of the operating elements 21 of the operating unit 20, here different keys by way of example, is transmitted via the receiving unit 13 to a motor control 14 which converts the received signals into motor currents with which the motors of the adjustment drives 7, 8 are driven.

Figure 3:
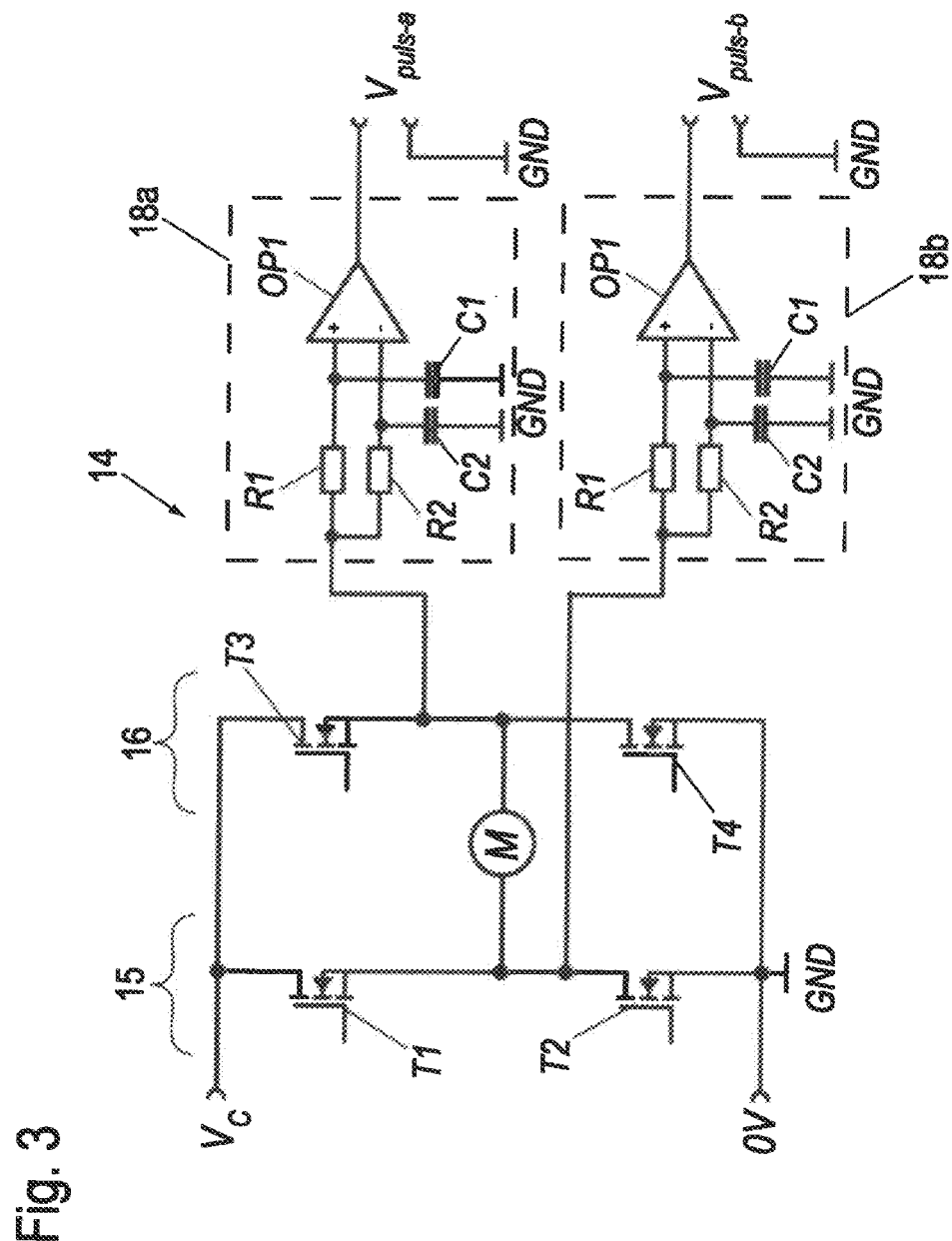
FIG. 3 shows a schematic circuit diagram of an embodiment example of a motor control of a control device of a furniture drive.

FIG. 3 shows a part of the motor control 14 in more detail in a schematic circuit diagram for a first embodiment example. Shown is the actuation of a motor M of one of the adjustment drives 7, 8. The motor M is connected between the center taps of two bridge branches 15, 16, which together form an H-bridge.

Each bridge branch 15, 16 comprises a series connection of two semiconductor switching elements, in this case mosfets T1, T2 and T3, T4. The two bridge branches 15, 16 are supplied by a supply voltage Vc, which is provided by the power supply unit 13. The supply voltage Vc is a positive DC voltage compared to a ground potential GND, which corresponds to a voltage of 0 volt (V).

Control electronics for the semiconductor switching elements are not shown for reasons of clarity. Depending on the signals output by the receiving unit 13, either the mosfets T1 and T4 or T2 and T3 are controlled so that they become conductive. In the idle state of the adjustment drive, on the other hand, it is intended to control either the mosfets T2 and T4 (low-side) or the mosfets T1 and T3 (high-side) in order to implement a motor brake (also called EMF brake).

The motor M is a DC motor with collector, whose communication is detected in order to enable relative position detection of the associated adjustment drive.

For this purpose, the H-bridge circuit is connected to an evaluation circuit which has two edge detectors 18a, 18b. Each of the edge detectors 18a, 18b is connected with an input to the respective center tap of the two bridge branches 15, 16.

The edge detectors 18a, 18b have an identical design and each have an operational amplifier OP1, whose inputs are connected in each case to the center tap of the bridge branches 15, 16 via a low pass filter. The two low-pass filters include the resistors R1 and R2 and the associated capacitors C1 and C2. In this case, the resistors R1 and R2 and/or the capacitors C1 and C2 differ in their values, so that the two low-pass filters have different time constants.

A communication edge at the input of the respective edge detector 18a, 18b is thereby converted into a pulse at the output of the operational amplifier OP1. The output of the operational amplifier OP also represents an output Vpuls-a or Vpuls-b for commutation pulses of the respective edge detector 18a, 18b. Depending on the operating direction of the motor M, one or the other of the two low-side transistors T2 or T4 is switched through and accordingly, one or the other edge detector 18a, 18b is active.

The pulses can be counted to detect commutation of the motor M and thus its rotation, and to track the relative position of the associated adjustment drive. The counting of the pulses is not shown in closer detail in FIG. 3. It is preferably carried out in such a way that a detected position is stored in a non-volatile memory, so that the correct position value is maintained independently of a permanent power supply. While the motor M is rotating, for example, a comparison can be made with possible stored positions in order to be able to move to a stored position in a targeted manner.

The relative position detection thus realized is preferably coupled to an absolute position detection of at least one reference position. This can be detected, for example, via a (limit) switch arranged along the travel path of the adjustment drive.

Figure 4:
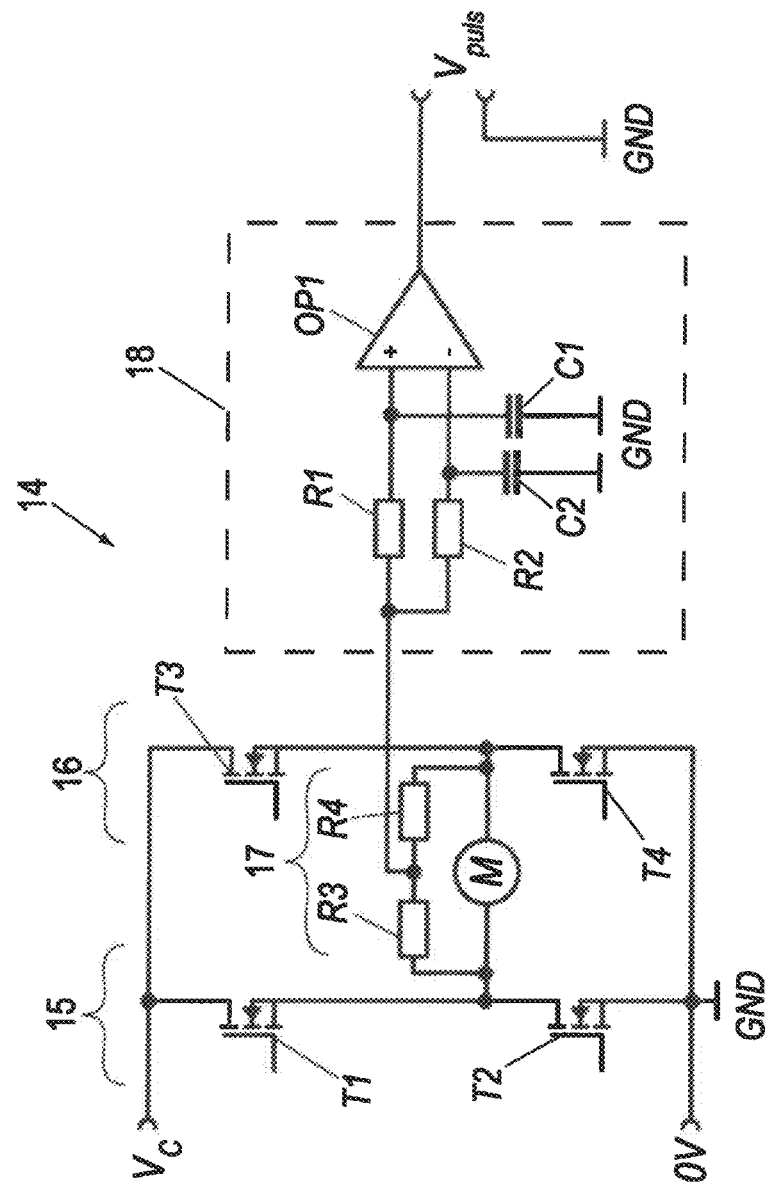
FIG. 4 shows a schematic circuit diagram of a further embodiment example of a motor control of a control device of a furniture drive.

FIG. 4 shows in the same way as FIG. 3 a part of the motor control 14 in a further embodiment example. The same reference numerals indicate the same or equally effective elements as in the figures shown above. In the basic construction, the embodiment example of FIG. 4 corresponds to that of FIG. 3, the description of which is hereby referred to.

In contrast to FIG. 3, for example, the evaluation circuit in this example has only one edge detector 18. A resistance bridge 17 is arranged parallel to motor M, which has two resistors R3, R4 in series connection. A center tap of the resistance bridge 17 is coupled to the edge detector 18. The edge detector 18 in turn has an operational amplifier OP1, whose inputs are each connected via a low-pass filter to the center tap of the resistor bridge 17. A communication edge at the input of the edge detector 18 is converted into a pulse at the output of the operational amplifier OP1, as in the example in FIG. 3, but here independently of which of the low-side transistors T2 or T4 is connected through. For each of the two directions of rotation of motor M, pulses are thus output at the output of operational amplifier OP1, which also represents an output Vpuls for commutation pulses of edge detector 18. As described in connection with FIG. 3, the pulses can be counted in order to detect commutation of motor M and thus its rotation and to track the relative position of the assigned adjustment drive.

In the setups shown in FIGS. 3 and 4, a voltage signal proportional to the motor current, which is evaluated by edge detector 18, 18a, 18b, is generated as a voltage drop at the internal resistance of one of the mosfets T2 or T4. It is made use of the fact that a mosfet has an inherent internal resistance in the range of several 10 or 100 milliohms in the switched-through (conducting) state. This internal resistance is used according to the application to generate a voltage drop s a measure of the motor current, which is evaluated to detect the commutation of the motor.

Since the internal resistance of the mosfets is inherently present in the conductive state of the transistor, an additional shunt is not required, which means no additional voltage drop is generated. This results in the most energy-efficient operation of the adjustment drive. Furthermore, no additional power loss in the form of heat is generated which would have to be dissipated.

With the circuit according to FIG. 4, the resistance bridge 17 ensures that the motor current can be measured in any operating direction of the motor M, i.e. that both the mosfet T2 and the mosfet T4 with its internal resistance form a measuring resistance. Preferably, the "low-side" and the "high-side" mosfets differ with regard to their contact resistance in order to obtain the best possible signal at edge detector 18. When using different types of the mosfets on the positive or negative supply voltage side, e.g. p-types versus n-types, this is usually self-evident.

What is claimed is:

1. An electromotive furniture drive, comprising:
    an adjustment drive for an electromotive movement of a movable furniture component relative to a further furniture component, said adjustment drive including a motor;
    an operating unit generating a signal actuating the motor of the adjustment drive;
    an evaluation unit;
    a control device including a semiconductor sower switch for switching a motor current of the motor based on the generated signal, with a voltage dropping across the semiconductor power switch being supplied to the evaluation unit in order to detect commutation edges of the motor, and
    a resistance bridge comprising two resistors connected in series at a center tap and arranged in parallel with the motor, said evaluation unit being connected to the center tap between the resistors.

2. The electromotive furniture drive of claim 1, wherein the semiconductor power switch is a MOSFET.

3. The electromotive furniture drive of claim 1, wherein the control device includes four of said semiconductor power switch in an H-bridge arrangement for the motor.

4. The electromotive furniture drive of claim 1, wherein the evaluation unit is connected to a central tap of a bridge branch of the H-bridge arrangement.

5. The electromotive furniture drive of claim 1, wherein the evaluation unit comprises an edge detector.

6. The electromotive furniture drive of claim 1, wherein the evaluation unit comprises an edge detector which includes an operational amplifier having inputs connected via low-pass filters to the center tap between the resistors.

7. An electromotive furniture drive, comprising:
    an adjustment drive for an electromotive movement of a movable furniture component relative to a further furniture component, said adjustment drive including a motor;
    an operating unit generating a signal actuating the motor of the adjustment drive;
    an evaluation unit; and
    a control device including four semiconductor power switches in an H-bridge arrangement for the motor for switching a motor current of the motor based on the generated signal, with a voltage dropping across the semiconductor power switches being supplied to the evaluation unit in order to detect commutation edges of the motor,
    wherein the evaluation unit comprises two edge detectors which are connected to central taps, respectively, of bridge branches of the H-bridge arrangement.

8. The electromotive furniture drive of claim 7, wherein the semiconductor power switch is a MOSFET.

9. An electromotive furniture drive, comprising:
    an adjustment drive for an electromotive movement of a movable furniture component relative to a further furniture component, said adjustment drive including a motor;
    an operating unit generating a signal actuating the motor of the adjustment drive;
    an evaluation unit; and
    a control device including four semiconductor power switches in an H-bridge arrangement for the motor for switching a motor current of the motor based on the generated signal, with a voltage dropping across the semiconductor power switches being supplied to the evaluation unit in order to detect commutation edges of the motor,
    wherein the evaluation unit is connected to a central tap of a bridge branch of the H-bridge arrangement and wherein the evaluation unit comprises an edge detector which includes an operational amplifier having inputs connected via low-pass filters to the center tap of the bridge branch.

10. The electromotive furniture drive of claim 9, wherein the semiconductor power switch is a MOSFET.

11. A method for detecting a position of an adjustment drive of an electromotive furniture drive, said method comprising:
    actuating a motor of the adjustment drive as a function of a signal from an operating unit, with the signal switching a motor current of the motor via a semiconductor power switch of a control device;
    evaluating a voltage dropping across the semiconductor power switch to detect a commutation of the motor;
    detecting by an evaluation unit edges of the motor current; and
    outputting a pulse at an output when an edge is detected by the evaluation unit.

12. The method of claim 11, further comprising counting pulses at the output to determine a change in a position of the adjustment drive.

13. The method of claim 12, further comprising determining, starting from a reference position, an absolute position of the adjustment drive on the basis of a determined change in the position.

14. A furniture comprising an electromotive furniture drive, said electromotive furniture drive comprising an adjustment drive including a motor for an electromotive movement of a movable furniture component relative to a further furniture component, an operating unit generating a signal to actuate the motor of the adjustment drive, an evaluation unit, a control device including a semiconductor power switch for switching a motor current of the motor based on the generated signal, with a voltage dropping across the semiconductor power switch being supplied to the evaluation unit in order to detect commutation edges of the motor, and a resistance bridge comprising two resistors connected in series at a center tap and arranged in parallel with the motor, said evaluation unit being connected to the center tap between the resistors.

15. The furniture of claim 14, wherein the semiconductor power switch is a MOSFET.

16. The furniture of claim 14, wherein the control device includes four of said semiconductor power switch in an H-bridge arrangement for the motor.

17. The furniture of claim 16, wherein the evaluation unit is connected to a central tap of a bridge branch of the H-bridge arrangement.

18. The furniture of claim 14, wherein the evaluation unit comprises an edge detector.

19. The furniture of claim 14, wherein the evaluation unit comprises an edge detector which includes an operational amplifier having inputs connected via low-pass filters to the center tap between the resistors.

20. A furniture, comprising an electromotive furniture drive, said electromotive furniture drive comprising an adjustment drive including a motor for an electromotive movement of a movable furniture component relative to a further furniture component, an operating unit generating a signal to actuate the motor of the adjustment drive, an evaluation unit, and a control device including four semiconductor power switches in an H-bridge arrangement for the motor for switching a motor current of the motor based on the generated signal, with a voltage dropping across the semiconductor power switches being supplied to the evaluation unit in order to detect commutation edges of the motor, wherein the evaluation unit comprises two edge detectors which are connected to central taps, respectively, of bridge branches of the H-bridge arrangement.

21. A furniture, comprising an electromotive furniture drive, said electromotive furniture drive comprising an adjustment drive including a motor for an electromotive movement of a movable furniture component relative to a further furniture component, an operating unit generating a signal to actuate the motor of the adjustment drive, an evaluation unit, and a control device including a semiconductor power switch for switching a motor current of the motor based on the generated signal, with a voltage dropping across the semiconductor power switch being supplied to the evaluation unit in order to detect commutation edges of the motor, said control device including four of said semiconductor power switch in an H-bridge arrangement for the motor, with the evaluation unit being connected to a central tap of a bridge branch of the H-bridge arrangement, wherein the evaluation unit comprises an edge detector which includes an operational amplifier having inputs connected via low-pass filters to the center tap of the bridge branch.

* * * * *